May 7, 1929.  G. B. SPRING  1,712,364
REENFORCEMENT FOR POLES
Filed March 18, 1927
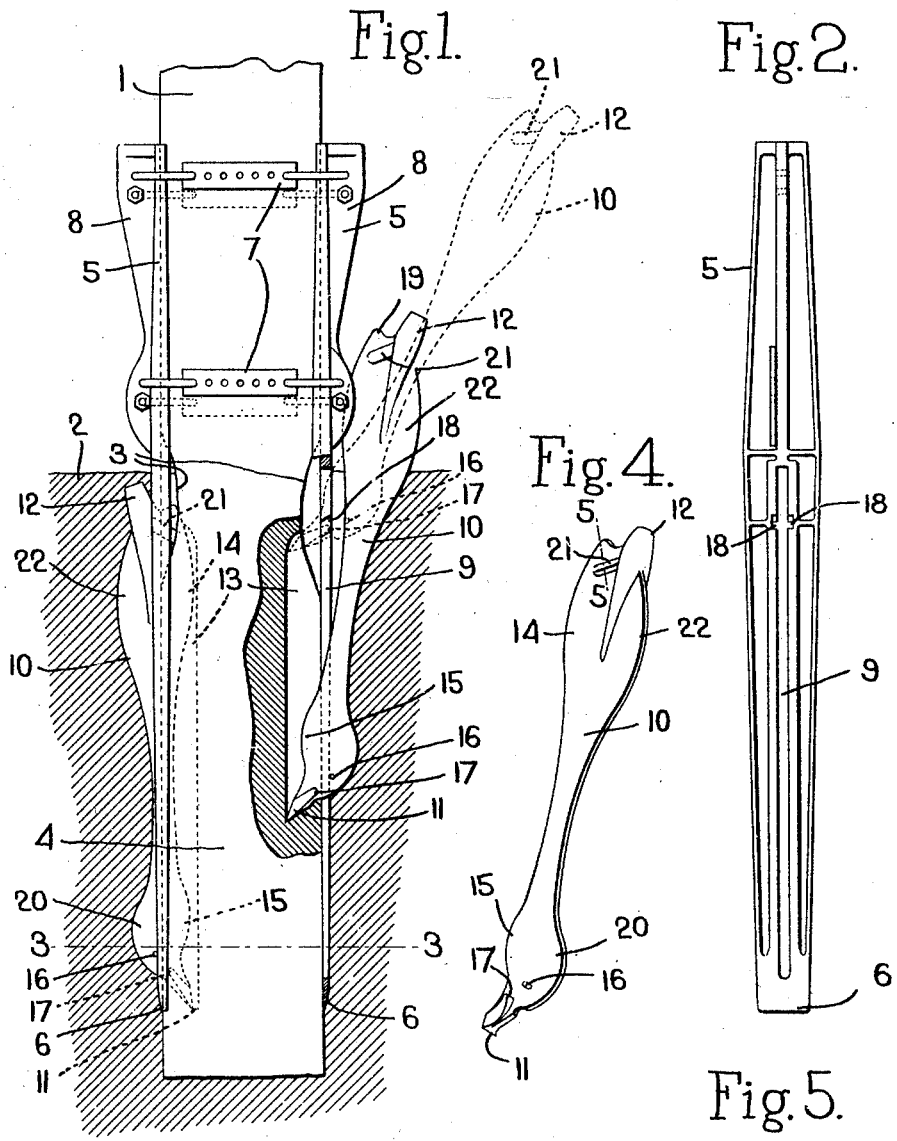
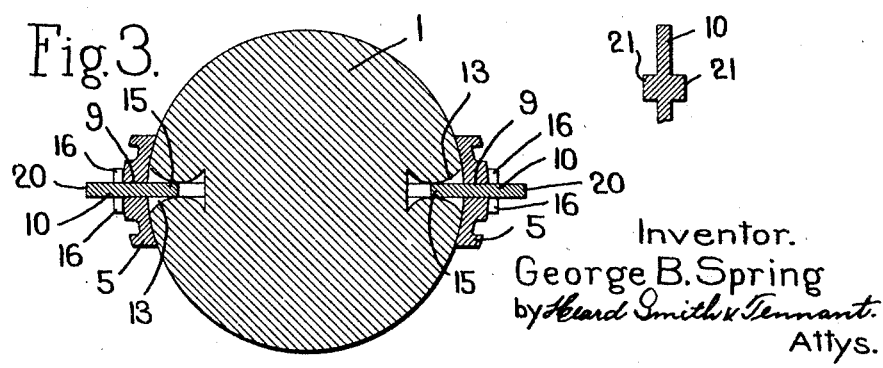
Inventor.
George B. Spring
by Heard Smith & Tennant
Attys.

Patented May 7, 1929.

1,712,364

UNITED STATES PATENT OFFICE.

GEORGE B. SPRING, OF NEWTON, MASSACHUSETTS.

REENFORCEMENT FOR POLES.

Application filed March 18, 1927. Serial No. 176,406.

This invention relates to means for reenforcing telegraph poles, telephone poles and other transmission poles.

Wooden poles are most commonly used for telegraph, telephone and other transmission poles but a wooden pole has the disadvantage that after a few years it becomes weakened or decayed at or just below the surface of the earth. It has been proposed to reenforce a weakened pole by placing in the earth alongside thereof one or more reenforcing members which are clamped to the pole above the earth. If, however, a reenforced pole is quite badly weakened by decay it will have little or no strength at the weakened spot to resist swaying movement of the pole and in such case the swaying movement must be resisted entirely by the reenforcing member or members. If the reenforcing member is of the type which is adapted to be driven into the earth alongside of the pole and is clamped to the pole above the earth only then the main resistance to the swaying tendency of a weakened pole is the resistance of the earth against the portions of the reenforcing members that are embedded therein and if the earth is soft such resistance may not be sufficient for the purpose.

One of the objects of my present invention is to provide an improved reenforcement for poles by which the earth resistance of the butt of the pole may be added to that of the reenforcing members in preventing the swaying of a reenforced pole and in holding the pole in erect position. I accomplish this object herein by providing a reenforcing member which is constructed so that after it is driven into the earth alongside of the pole and is clamped thereto an anchoring member may be driven through the reenforcing member into the butt of the pole thus interlocking the reenforcing member and the pole butt in such a way that the earth resistance of the butt will be added to that of the reenforcing members in preventing the pole from swaying.

In order to give an understanding of the invention I have illustrated in the drawings a selected embodiment thereof which will now be described after which the novel features will be pointed out in the appended claims.

Fig. 1 is a view of a pole having my improved reenforcing member applied thereto and showing the manner in which the anchoring member is driven into the pole;

Fig. 2 is a side view of the reenforcing member without the anchoring member;

Fig. 3 is an enlarged section on the line 3—3 of Fig. 1;

Fig. 4 is a perspective view of the anchoring member.

Fig. 5 is a section on the line 5—5, Fig. 4.

In the drawings 1 indicates a wooden pole such as would be used for telephone, telegraph or transmission purposes, said pole being illustrated as set into the earth 2. A wooden pole soon becomes decayed more or less at or just below the surface of the earth as indicated at 3 thereby greatly weakening the pole. This decay, however, does not usually extend much below the surface of the earth and the butt 4 of the pole which is embedded in the earth will retain its original sound condition for a long period.

The pole reenforcement herein shown is of that type which is adapted to be driven into the earth alongside of the pole, one or more such reenforcing members being used for each pole. In the drawings I have shown two reenforcing members indicated at 5 respectively, there being one such member on each side of the pole. These members are metal and preferably have sharpened lower ends 6 so as to facilitate their being driven into the earth alongside of the pole. The members when driven are clamped to the pole by clamping devices 7 of any suitable or usual construction. Each reenforcing member is shown as having a rib 8 to which the clamping members 7 are secured as usual in devices of this sort.

As stated above one object of my present invention is to provide a novel construction by which after the reenforcing members 5 have been driven into the earth alongside of the pole they may be interlocked with the butt 4 of the pole below the earth. This is accomplished by providing said members with openings through which an anchoring member or interlocking member may be driven into the pole, said member when so driven interlocking the lower ends of the reenforcing members to the butt of the pole in such a way that the two form practically a unit so far as earth resistance is concerned. The interlocking member may have various shapes and constructions without departing from the invention.

In the construction herein shown the anchoring member is designed so that it not only furnishes the interlocking connection between the lower end of the reenforcing members and the butt 4 of the pole but it also provides a fin which projects outwardly beyond the reenforcing members and which adds to the earth resistance thereof.

Each reenforcing member is herein shown as provided in its lower end with a slot 9. The anchoring members are indicated at 10. Each is formed at its lower end with a sharpened nose or toe 11 which is adapted to be driven into the pole butt and at its upper end with a head portion 12 adapted to receive hammer blows for driving the anchoring member into position.

In inserting the anchoring member the toe portion 11 thereof is inserted through the upper end of the slot 9 as shown in dotted lines Fig. 1 and then the anchoring member is driven downwardly by a hammer and in its downward movement the nose or toe thereof plows a grove or furrow 13 in the side of the pole butt. When the anchoring member has been driven so that the nose or toe is at the lower end of the slot as shown at the left in Fig. 1 then the upper end of the anchoring member may be forced inwardly into the upper end of the groove 13. The upper end of the anchoring member is of sufficient width so that when it is in place the inner edge 14 thereof will form a fin which enters the upper end of the furrow 13 and thus provides interlocking means at this point between the reenforcing member and the pole butt. At the lower end the toe 11 is embedded in the butt and also the inner edge portion 15 of the anchoring member so that the reenforcing member becomes anchored to or interlocked with the pole butt for substantially the full length below the surface of the earth.

In order to assist in guiding the anchoring member as it is being driven the latter is shown as having projections 16 and 17 on each side near the toe and the upper end of each wall of the slot 9 is shown as having a transverse groove 18 through which the projections 17 may be entered.

When the reenforcing member is to be driven into position the nose or toe 11 thereof is inserted through the upper end of the slot 9 and the projections 17 introduced through the grooves 18. These grooves are inclined slightly as shown in Fig. 1 so that when the projections 17 have passed through them the projections 16 will engage the outside of the reenforcing member 5. As the anchoring member is driven downwardly the lower end thereof will be guided by the projections 16, 17, the projections 17 riding on the inside of the reenforcing member and the projections 16 on the outside thereof. When the reenforcing member has been driven until the lower end thereof strikes the bottom of the slot 9 then by striking the upper end thereof a blow the corner 19 will be forced through the slot and the upper edge 14 will be driven into the upper end of the furrow 13 as stated above.

The toe 11 is held in interlocking engagement with the pole butt by the projections 16, 17 and the upper end of the anchoring member will be held in its interlocking engagement with the pole butt by the ribs 21 which are formed on opposite sides of the anchoring member and are adapted to enter the grooves 18 as the anchoring member is forced into its final position.

The anchoring member is shown as shaped at its lower end so as to present a fin portion 20 which extends outwardly beyond the reenforcing member and thus provides an added earth resistance at this point. At the upper end the anchoring member is widened so that the portion 22 thereof extends outwardly to a considerable extent beyond the reenforcing member when said anchoring member is in its final position and these portions 20 and 22 thus provide added earth resistance at the bottom of the butt and near the earth's surface.

By means of this construction the butt 4 of the pole will be firmly anchored to the reenforcing members so that the reenforcing members and the butt will act as a unit in providing earth resistance which will prevent swaying of the pole and hence there is no danger that the reenforcing members will be pulled away from the butt and out of the earth by a lateral swaying movement of the pole.

The projections 17 are shown as ribs which extend to the sharpened edge of the toe portion and thus form a wide cutting edge.

I claim:

1. The combination with a pole, of a reenforcing member set into the earth alongside of the pole and extending above the earth, means for clamping the reenforcing member to the pole above the earth, and an anchoring member adapted to be driven through the reenforcing member and into the butt of the pole below the earth thereby to interlock the portion of the reenforcing member which is embedded in the earth with the butt of the pole, portions of the anchoring member when the latter is in operative position being situated outside the reenforcing member and thus providing additional earth resistance.

2. The combination with a pole, of a reenforcing member set into the earth alongside of the pole and extending above the earth, means for clamping the reenforcing member to the pole above the earth, said reenforcing member having an opening in the portion below the surface of the earth, and an anchoring member adapted to be driven through said opening into the pole butt, said anchoring member when in operative position having interlocking engagement with the pole butt at widely separated points.

3. The combination with a pole, of a reenforcing member set into the earth alongside of the pole and extending above the surface of the earth, means for clamping the reenforcing member to the pole above the earth's surface, the lower end of said reenforcing member having a slot, and an elongated anchoring member having a sharpened toe separable from the reenforcing member and adapted to be inserted in the slot after the reenforcing member is driven into the earth, the ends of said anchoring member projecting through the slot and being embedded in the butt of the pole thereby locking the reenforcing members to the pole butt.

4. The combination with a pole, of a reenforcing member set into the earth alongside of the pole and extending above the surface of the earth, means for clamping the reenforcing member to the pole above the earth's surface, the portion of the reenforcing member embedded in the earth being provided with a slot, the walls of which at the upper end of the slot are formed with grooves, and an elongated anchoring member separable from the reenforcing member and having a sharpened toe portion and a projection adjacent said portion, said toe portion being adapted to be inserted through the upper end of the slot and the projections through the groove and said anchoring portion being constructed to be driven downwardly in the direction of the slot thereby to cause the toe portion to cut a groove in the pole butt and to become anchored to the butt.

5. The combination with a pole, of a reenforcing member set into the earth alongside of the pole and extending above the surface of the earth, means for clamping the reenforcing member to the pole above the earth's surface, the lower portion of said reenforcing member having a slot, an elongated anchoring member separable from the reenforcing member and provided at its lower end with a sharpened toe portion and also provided with two projections at its lower end, the toe portion of the anchoring member being adapted to be inserted through the upper end of the slot and said anchoring member adapted to be driven longitudinally of the slot with the projections engaging the inner and outer faces of the reenforcing member and thus guiding the anchoring member, said toe portion plowing a groove in the pole butt as the anchoring member is driven, the upper end of the anchoring member being widened and adapted to enter through the slot into the upper end of the groove, whereby the reenforcing member is anchored to the pole butt.

6. The combination with a pole, of a reenforcing member set into the earth alongside of the pole and extending above the earth, means for clamping the reenforcing member to the pole above the earth, and an anchoring member adapted to be driven through the reenforcing member and into the butt of the pole below the earth thereby to interlock the portion of the reenforcing member which is embedded in the earth with the butt of the pole, said anchoring member when in operative position having a portion projecting beyond the reenforcing member near the surface of the earth and another portion so projecting near the bottom of the butt of the pole, said projecting portions providing additional earth resistance.

7. The combination with a pole, of a reenforcing member set into the earth alongside of the pole and extending above the earth, means for clamping the reenforcing member to the pole above the earth, and an anchoring member removable from the reenforcing member and extending longitudinally of the latter beneath the earth, said anchoring member having interlocking engagement with both the pole butt and the reenforcing member.

8. The combination with a pole, of a reenforcing member set into the earth alongside of the pole and extending above the earth, means for clamping the reenforcing member to the pole above the earth, and an anchoring member removable from the reenforcing member and extending longitudinally of the latter beneath the earth, said anchoring member being interlocked throughout its length with the reenforcing member and having interlocking engagement at its upper and lower ends with the pole butt.

In testimony whereof, I have signed my name to this specification.

GEORGE B. SPRING.